Oct. 25, 1955

J. E. WHITFIELD 2,721,747

HYDRAULIC SHAFT SEAL

Filed Dec. 21, 1951

INVENTOR.
Joseph E. Whitfield
BY
Otto Moeller
Attorney

Oct. 25, 1955  J. E. WHITFIELD  2,721,747
HYDRAULIC SHAFT SEAL
Filed Dec. 21, 1951  3 Sheets-Sheet 2

INVENTOR.
Joseph E. Whitfield
BY
Otto Maeller
Attorney

Oct. 25, 1955       J. E. WHITFIELD       2,721,747
HYDRAULIC SHAFT SEAL
Filed Dec. 21, 1951                3 Sheets-Sheet 3

INVENTOR.
Joseph E. Whitfield
BY
Otto Moeller
Attorney

United States Patent Office 2,721,747
Patented Oct. 25, 1955

2,721,747

HYDRAULIC SHAFT SEAL

Joseph E. Whitfield, Erie, Pa., assignor to Read Standard Corporation, New York, N. Y., a corporation of Delaware Application December 21, 1951, Serial No. 262,729

4 Claims. (Cl. 286—9)

This invention relates to improvements in rotary shaft seals for protecting bearings from access thereto of contaminating material and more particularly to a seal for use in connection with a blower to arrest leakage along the rotor shaft projecting from the blower housing.

An object of the invention is to provide an improved hydraulic seal for effectively sealing against leakage along a rotating shaft and to prevent contamination of the shaft bearings.

Another object is to provide an improved seal that is continuously self-packing and that eliminates the necessity for renewing the packing material.

Another object is to provide a novel hydraulic seal for the shaft of a blower that effectively seals against leakage of gases from the blower housing along the shaft to the shaft bearings or to the atmosphere and that seals against hydraulic sealing fluid leaking along the shaft into the blower housing.

Another object is to provide a hydraulic seal of the above character which includes a reservoir for the sealing liquid, with means for maintaining a continuous supply of sealing liquid to the shaft without replenishing the supply of liquid in the reservoir.

Another object is to provide a hydraulic seal of the above character which includes a common reservoir for the sealing fluid and the bearing lubricant.

Another object is to provide a hydraulic seal for the shaft extensions of the rotors of a blower wherein an equal sealing pressure is maintained on all the rotor shaft extensions.

Other objects and advantages of the invention will become apparent from the following description when read in connection with the accompanying drawings, in which.

For the purpose of illustration, the seal comprising my invention is shown as applied to a fluid device or blower of the rotary screw type having interengaging helical rotors as disclosed in my United States Letters Patent No. 2,287,716, granted June 23, 1942. However, it will become apparent from the following description that the invention is of wide application wherever a tight seal for a shaft is desired.

Figure 1:
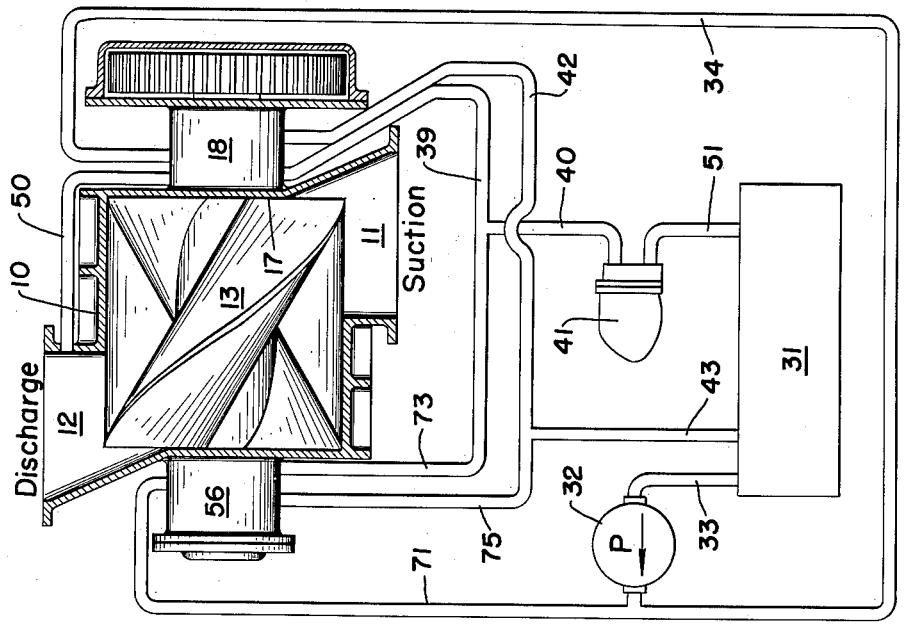
Figure 1 is a sectional view through a blower with the novel sealing units applied to the rotor shaft extensions shown in elevation and the hydraulic circulating system for the units being shown diagrammatically.

In Figure 1, the novel sealing structure is shown applied to the opposite ends of the shaft of the main or male rotor of a blower of the type disclosed in my above referred to patent. The numeral 10 designates the housing of the blower provided with diagonally disposed ports 11 and 12 at opposite ends thereof which function as discharge or suction ports depending upon the direction of rotation of the rotors. For the purpose of the present description, the port 11 will be considered as the suction or inlet port and the port 12 as the discharge or outlet port.

Figure 2:
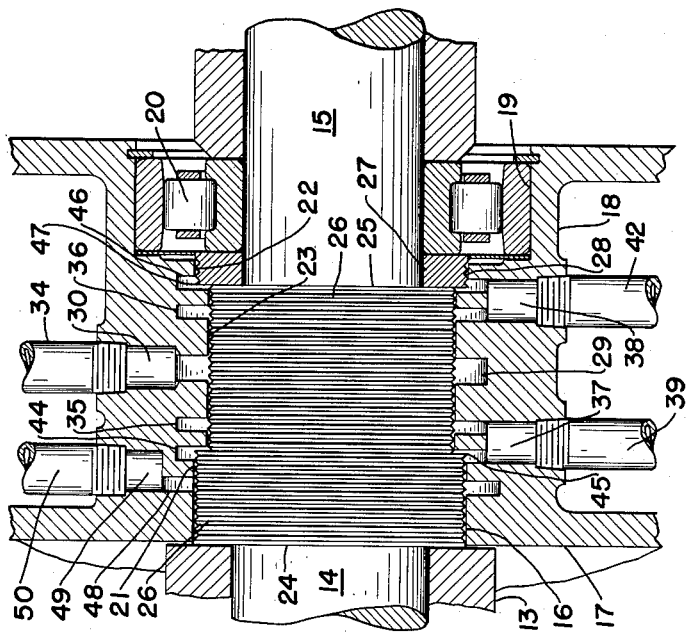
Figure 2 is a fragmentary sectional view taken through the sealing unit on the inlet or suction side of the blower of Figure 1.

Disposed within the housing 10 is the rotor 13 provided with a shaft 14. Referring to Figure 2, which shows details of the seal at the suction end of the blower, the shaft 14 is provided with an extension 15 projecting through an opening 16 in the end wall 17 of the blower housing 10 into the cylindrical casing 18. For purpose of illustration, the casing 18 is shown integral with housing end wall 17, but it is evident that if preferred it may be formed as a separate unit suitably secured with the housing end wall 17.

The axially outer end of the casing 18 is provided with an enlarged bore 19 in which is mounted a roller bearing assembly 20 for the extension 15 of rotor shaft 14. The hydraulic seal is accommodated in the cylindrical casing 18 axially inward of the bearing assembly 20, and is particularly adapted, where corrosive gases are being handled by the blower, to prevent creepage of such corrosive gases along the rotor shaft from the housing 10 to the bearing assembly 20. In many instances it is desirable to use in the hydraulic seal a liquid other than oil such as is used in lubricating the bearing assembly, and in the form of the invention shown in Figure 2, creepage of such sealing liquid to the bearing assembly with consequent impairment thereof if the sealing liquid happens to be of a type injurious to the bearing, is effectively prevented.

The sealing structure will now be described in detail. The inner end of the casing 18 opposite the bore 19 for the bearing assembly 20 is formed with a bore 21 in registering communication with the opening 16 in the housing end wall 17. Inwardly adjacent the bore 19 and communicating therewith, the casing 18 is provided with a bore 22 of smaller diameter than bore 19 and preferably the same diameter as bore 21. Between and communicating with bores 21 and 22, the casing 18 is provided with a bore 23 of smaller diameter than the bores 21 and 22. Fitting within the bores 21 and 23 of the casing 18 with a minimum practical clearance are enlarged shaft portions 24 and 25, respectively, which may be integral with the shaft 14 and its extension 15, or may be in the form of a sleeve keyed or otherwise suitably secured on the shaft.

The shaft portions 24 and 25 are preferably though not necessarily provided with a series of closely spaced circumferential ridges and grooves 26. When so formed, the shaft portions 24 and 25 are arranged to fit snugly into the bores 21 and 23, so that the ridges of the shaft, which is formed of a metal harder than the casing 18, cut into the casing to form a clearance. If the casing does not cut readily enough, the bores 21 and 23 may be lined with babbitt or other suitable metal softer than the casing for engagement with the ridges of the shaft portions 24 and 25. Leakage along the shaft is by this arrangement considerably reduced. Disposed in the bore 22 is a sealing ring 27 secured to the shaft extension 15 for rotation therewith and which is preferably provided with circumferential ridges and grooves 28 functioning in the same manner as the ridges and grooves 26.

The casing 18 is provided intermediate the ends of the bore 23 with an interior annular groove 29 to which a sealing liquid is supplied under pressure through a port 30 from the sealing liquid reservoir 31. A pump 32 pumps the sealing liquid from the reservoir 31 through pipe 33 and delivers it under pressure to the branch pipe 34 which in turn connects with the port 30. The sealing liquid inlet pressure is maintained above the discharge pressure of the blower, for a purpose to be later explained, preferably though not necessarily between about 25% to about 50% above the discharge pressure.

Spaced from and at opposite sides of the pressure sealing liquid groove 29, the casing 18 is provided with the interior annular grooves 35 and 36, both of these grooves being in that portion of the casing defining the bore 23. The grooves 35 and 36 communicate, respectively, with ports 37 and 38 formed in the bottom portion of the casing 18. Port 37 connects with the sealing liquid reservoir 31 through the branch pipe 39 and the pipes 40 and 51, between which is interposed a float valve 41. The float valve 41 may be of any suitable type that will permit liquid from the pressurized line 40 to drain therefrom into atmospheric pressure line 51 and prevents gases in the pressurized line 40 from escaping to the atmospheric line 51, as for example a Sarco Type FA Float Trap. Port 38 connects directly with the sealing liquid reservoir 31 through the branch pipe 42 and the pipe 43.

The casing 18 is provided with another interior annular groove 44 spaced axially inward of the groove 35 which opens in overlapping relation to the adjacent ends of bores 21 and 23 and communicates with the port 37. The groove 44 thus encompasses the offset between the adjacent ends of the enlarged shaft portions 24 and 25, which forms a slinger 45 for a purpose to be described. Similarly, the casing 18 is provided with another interior annular groove 46 spaced axially outward of the groove 36 which opens in overlapping relation to the adjacent ends of bores 22 and 23 and communicates with the port 38. The groove 46 thus encompasses the offset between the adjacent ends of shaft portion 25 and the sealing ring 27 which form a slinger 47.

The casing 18 is provided with still another interior annular groove 48 which opens to the bore 21 and is disposed axially inward of the groove 44. The groove 48 communicates with a port 49 which is connected to the discharge end of the fluid device by a pipe 50.

Figure 3:
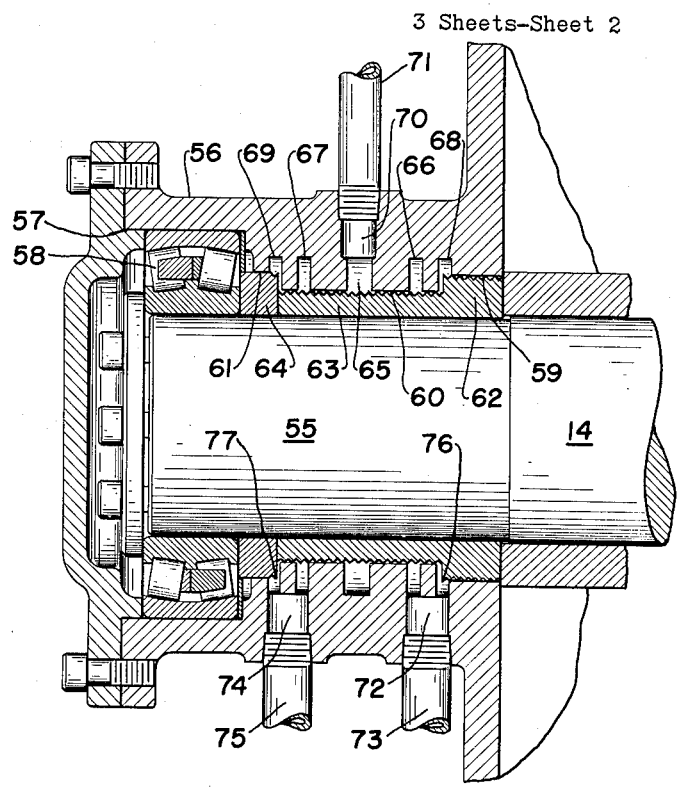
Figure 3 is a fragmentary sectional view taken through the sealing unit on the outlet or discharge side of the blower of Figure 1.

The seal structure at the discharge end of the blower, as shown in Figure 3 is, with a few differences which will be hereinafter particularly pointed out, similar to that at the suction end. The rotor shaft 14 is provided with a shaft extension 55 which extends into the cylindrical casing 56. The axially outer end of casing 56 is provided with an enlarged bore 57 in which is mounted the bearing assembly 58 for the shaft extension 55. In addition to bore 57, the casing 56 is provided with bores 59, 60 and 61 similar to the bores 21, 22 and 23, respectively, of the casing 18, previously described.

Fitting in the bores 59 and 60 are enlarged shaft portions 62 and 63, differing from the enlarged shaft portions 24 and 25 in that they are formed for assembly purpose as a removable sleeve. A sealing ring 64, similar to the sealing ring 27, is disposed in the bore 60, and is secured to the shaft extension 55 for rotation therewith.

The casing 56 is provided with the annular grooves 65, 66, 67, 68 and 69 corresponding to the similar grooves 29, 35, 36, 44 and 46, respectively, of the casing 18. It will be noted that the groove 48 and port 49 of the casing 18 and the pipe 50 of the sealing structure at the suction end of the blower are omitted from the casing 56 at the discharge end of the blower, and the reason therefore will become apparent when the functioning of the sealing structure is described.

The pressure sealing liquid groove 65 communicates with the port 70 which is connected with the sealing liquid reservoir 31 through the branch pipe 71, pump 32 and pipe 33. The grooves 66 and 68 communicate with the port 72 which is connected with the sealing liquid reservoir 31 through the branch pipe 73, pipes 40 and 51 and float valve 41. The grooves 67 and 69 communicate with the port 74 which is connected with the sealing liquid reservoir 31 through the branch pipe 75 and pipe 43.

In the functioning of the sealing srtucture, sealing liquid is pumped from the reservoir 31 by pump 32 through pipe 33 and is introduced into the groove 29, Figure 2, through branch pipe 34 at a pressure above the discharge pressure of the blower, as previously explained, and is also introduced into the groove 65, Figure 3, through branch pipe 71. Thus, any gases leaking from the blower outwardly through the running clearance between the casings 18, 56 and the respective shaft portions mounted therein, are effectively prevented from reaching the bearing assemblies 20 and 58, by the sealing liquid pressure in the grooves 29 and 65.

The sealing liquid that leaks from the pressure grooves 29 and 65 inwardly along the shaft portions 25 and 63, respectively, is caught in the grooves 35 and 66, respectively, and drains through ports 37 and 72, respectively, into the pipes 39 and 73, respectively, from whence it returns to the sealing liquid reservoir 31 through pipes 40 and 51 between which is interposed the float valve 41. The purpose of the float valve 41 is to permit sealing liquid, which may be under pressure as hereinafter explained, to return to the reservoir 31 while maintaining atmospheric pressure conditions therein.

Considering the sealing structure, Figure 3, at the discharge end of the blower, the pressure on the returning sealing fluid arises from the fact that there will be pressure leakage from the blower through the running clearance between the shaft portion 62 and the casing 56 which is communicated to the sealing liquid return pipe 73 through the groove 68 and port 72.

Considering the sealing structure, Figure 2, at the suction end of the blower, the pressure on the returning sealing fluid arises from the fact that there will be pressure leakage from the groove 48, which as previously described is connected with the discharge end of the blower through port 49 and pipe 50, along the shaft portion 24, which pressure is communicated to the sealing liquid return pipe 39 through the groove 44 and port 37.

The purpose of maintaining pressure in the groove 48 through its connection with the discharge end of the blower, is to prevent leakage of sealing liquid along the the shaft into the blower when there is a vacuum condition at the inlet end of the blower.

Having considered the disposition of the sealing liquid that leaks inwardly along the shafts from the pressure grooves 29 and 65, the disposition of the sealing liquid that leaks outwardly along the shafts will now be considered.

Taking first the sealing structure at the inlet end of the blower, Figure 2, sealing liquid leaking outwardly along shaft portion 25 from the pressure groove 29 is caught in the groove 36, drains through port 38 into return pipes 42, 43 and is returned at atmospheric pressure to sealing liquid reservoir 31. At the outlet end of the blower, Figure 3, sealing liquid leaking outwardly along shaft portion 63 from the pressure groove 65 is caught in the groove 67, drains through port 74 into return pipes 75, 43 and is returned at atmospheric pressure to sealing liquid reservoir 31.

As an additional precaution against leakage of sealing liquid along the shaft portions 24 and 62 into the blower, for example by capillary action, the additional grooves 44, Figure 2, and 68, Figure 3, draining into the ports 37 and 72, respectively, are provided, and in which grooves are disposed respectively, the slinger 45 formed by the offset between shaft portions 24 and 25, and the slinger 76 formed by the offset between shaft portions 62 and 63.

Similarly, as an additional precaution against leakage of sealing liquid to the bearing assemblies 20 and 58, the additional grooves 46, Figure 2, and 69, Figure 3, draining into the ports 38 and 74, respectively, are provided, and in which grooves are disposed the slingers 47 and 77, respectively.

Figure 4:
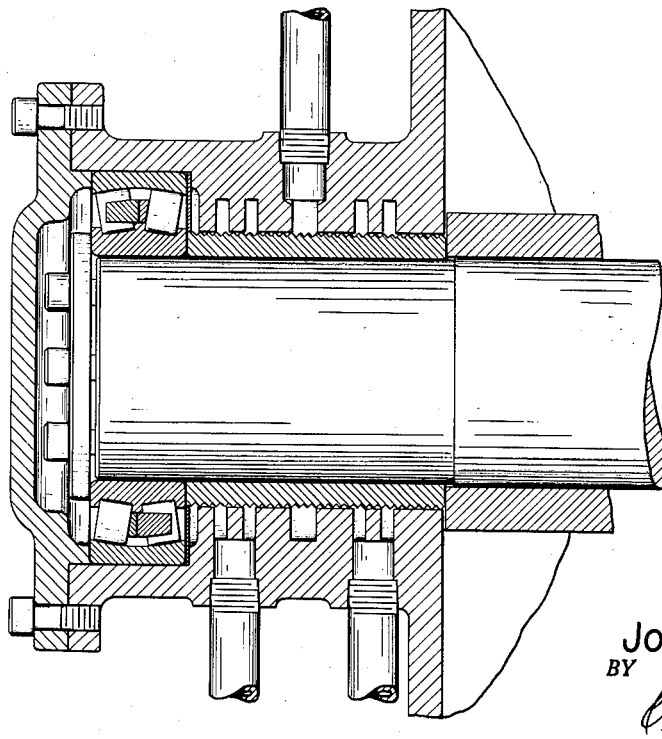
Figure 4 is a fragmentary sectional view through a modified form of seal unit.

In Figure 4 there is shown a modified form of the sealing structure at the discharge end of a blower, differing from the preferred form of Figure 3 in that the slingers 76 and 77 are omitted. Though not shown, it will be understood that the sealing structure at the suction end of the blower may also be similar to the preferred form shown in Figure 2 with the omission of the slingers 45 and 47.

Figure 5:
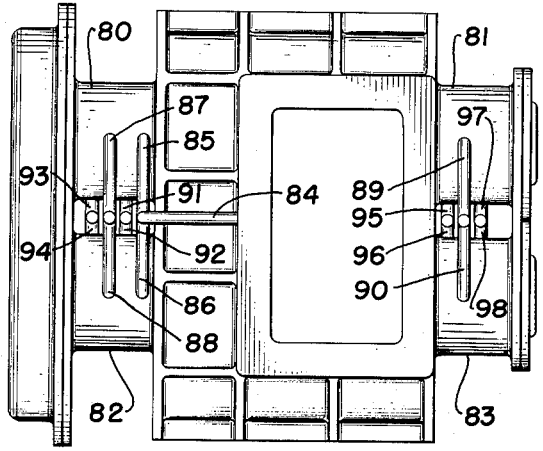
Figure 5 is a view in elevation of a blower showing a common piping arrangement for the sealing liquid of a pair of rotor shaft extensions.

In Figure 5 is shown a piping arrangement whereby the sealing structures for the shafts of both rotors of a blower are connected with the same sealing liquid circulating system. The numerals 80 and 81 designate the sealing structures for the shaft extensions of one of the mating rotors of a blower at the respective inlet and outlet sides thereof. The numerals 82 and 83 designate the sealing structures for the shaft extensions of the other of the mating rotors.

A pipe 84 and branch pipes 85 and 86, corresponding to pipe 50 of Figures 1 and 2, provide for communication between the discharge of the blower and grooves in the sealing structures 80 and 82 similar to the groove 48 of Figure 2. Branch pipes 87 and 88, correspond to pipe 34 of Figures 1 and 2, and direct sealing liquid under pressure into grooves in the sealing structures 80 and 82 similar to the groove 29 of Figure 2. Branch pipes 89 and 90, correspond to pipe 71 of Figures 1 and 3, and direct sealing liquid under pressure into grooves in the sealing structures 81 and 83 similar to the groove 65 of Figure 3. Branch pipes 91, 92, and 93, 94, correspond, respectively, to pipes 39 and 42 of Figures 1 and 2, and drain sealing liquid from grooves in the sealing structures 80 and 82 similar to the grooves 35 and 36 of Figure 2. Branch pipes 95, 96, and 97, 98, correspond, respectively, to pipes 73 and 75 of Figures 1 and 3, and drain sealing liquid from grooves in the sealing structures 81 and 83 similar to the grooves 66 and 67 of Figure 3.

Figure 6:
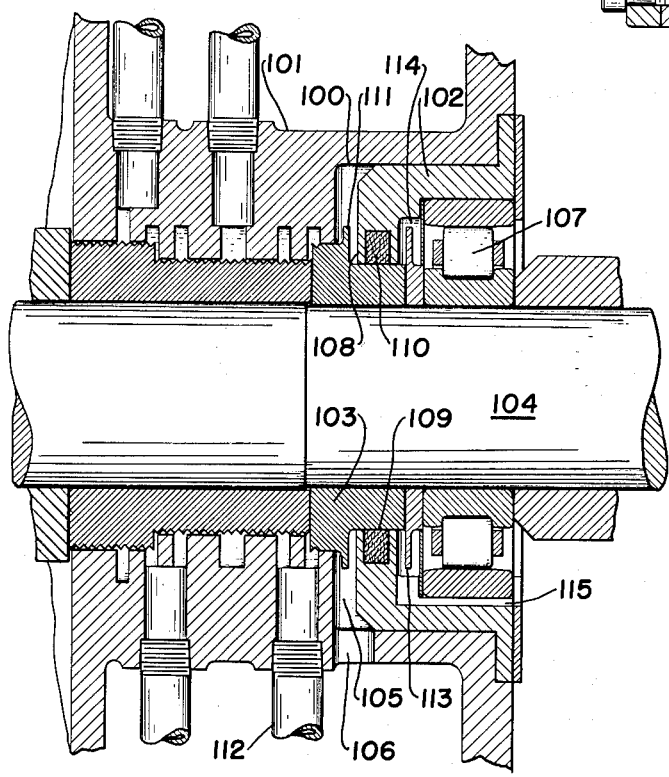
Figure 6 is a fragmentary sectional view through another modified form of seal unit.

Figure 6 shows a modification of the sealing structure in which there is provided sealing means preventing any leakage of lubricating oil from the bearing assembly to the sealing liquid drain. In many installations the sealing liquid will be something other than oil such as is used in lubricating the bearing assembly and leakage of lubricating oil into the sealing liquid may be detrimental and is therefore desirably avoided.

It will be seen that the only difference between the modification shown in Figure 6 and the construction shown in Figure 2, is in that portion disposed in the large bore 100 of the casing 101. A bearing carrier 102 is fitted closely into the bore 100 to a depth somewhat less than the depth of the bore 100, providing around the spacer member 103 which is fixed for rotation with the rotor shaft extension 104, an annular passage 105 which is open to atmosphere through the port 106.

In the outer portion of the bearing carrier 102 is mounted the bearing assembly 107. The axially inner portion of the bearing carrier 102 is formed with an annular radially inwardly extending flange 108, embracing the spacer member 103. The radially inner wall of the flange 108 is provided with an annular groove 109 in which groove is a suitable packing material 110, such as felt, providing a seal against leakage of lubricating oil from the bearing assembly 107 and protecting the bearing against contamination from atmosphere through the port 106. Any oil that does leak past the felt seal 110 is discharged to atmosphere through the passage 105 and port 106. A slinger 111 formed with the spacer member 103 and disposed in the passage 105 further insures against leakage of lubricating oil into the sealing liquid drain pipe 112. An additional slinger 113 is preferably provided between the spacer member 103 and the bearing assembly 107. The slinger 113 is secured for rotation with shaft extension 104 and is disposed in a counterbore 114 in the bearing carrier 102. An oil drain passage 115 is formed in the interior wall of the bearing carrier 102 and communicates with the counterbore 114.

It is understood that a similar sealing structure may be provided for the rotor shaft extension at the opposite end of the blower.

Figure 7:
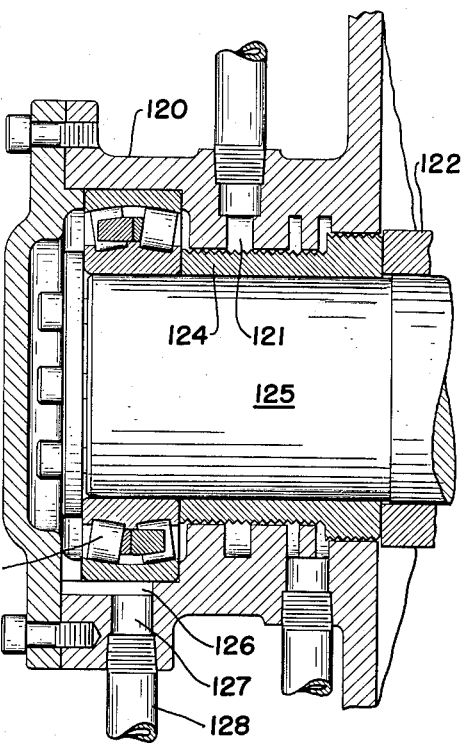
Figure 7 is a fragmentary sectional view taken through still another modified form of seal unit.

In Figure 7 is shown a modified form of the invention particularly adapted for use where the sealing liquid medium and the lubricating medium for the bearings is the same. As in the form of the invention shown in Figure 3, the modification is provided in the casing 120 with an annular groove 121 arranged to receive sealing liquid under pressure. Between the groove 121 and the blower rotor 122 the sealing structure is the same as in Figure 2, so that leakage of gases from the blower to the bearing assembly 123 is effectively prevented. However, since the sealing liquid and the lubricating medium are the same, no sealing means is provided to prevent leakage of sealing liquid from the groove 121 and the bearing assembly 123. Thus in the modification shown in Figure 7, oil leaking from the groove 121 outwardly along the enlarged shaft portion 124 of the rotor shaft extension 125 lubricates the bearing assembly 123. A groove 126 permits oil to drain through port 127 into the pipe 128 which returns the oil to a reservoir in the same manner that pipe 75 of Figure 1 leads to the reservoir 31. Thus in the present modification the sealing liquid and the lubricating oil comes from and is drained to a single reservoir.

I claim:

1. A seal adapted for sealing against leakage along a shaft including a stationary casing surrounding and having a running fit with said shaft, said casing having an internal annular groove opening to said shaft, means for supplying sealing liquid under pressure to said groove from a source of sealing liquid supply, said casing having a second internal annular groove spaced from said first groove axially of and opening to said shaft, said shaft having a slinger rotatable therewith in said second groove, said casing having a third internal annular groove between said first and second grooves opening to said shaft, and drain means communicating with said second and third grooves for draining sealing liquid leaking along said shaft from said first groove.

2. Sealing means for the rotor shaft extension protruding from the inlet end of the housing of a positive displacement axial flow blower, including a stationary casing surrounding and having a running fit with said protruding shaft, said casing having an internal annular groove opening to said shaft, means for supplying sealing liquid at a pressure higher than that of the gas in said housing to said groove from a source of sealing liquid supply, said casing having a second internal annular groove opening to said shaft and disposed between said housing and said first groove, said shaft having a slinger rotatable therewith in said second groove, said casing having a third internal annular groove between said first and second grooves opening to said shaft, drain means communicating with said second and third grooves for draining sealing liquid leaking along said shaft from said first groove, said casing having a fourth internal annular groove between said inlet end of said housing and said second groove opening to said shaft, and means providing communication between said last named groove and the outlet end of said blower housing for pressurizing said last named groove.

3. A fluid seal for a shaft including a stationary casing surrounding and having a running fit with said shaft, said casing having an internal annular groove opening to said shaft, means for supplying sealing liquid under pressure to said groove from a source of sealing liquid supply, said casing having a pair of internal annular grooves, one on each side of said pressure sealing liquid groove spaced therefrom axially of and opening to said shaft, said shaft having a pair of slingers rotatable therewith disposed respectively in said pair of grooves, said casing having a second pair of internal annular grooves, one between said pressure sealing liquid groove and each of said first pair of grooves, and drain means communicating with each of the pair of grooves on opposite sides of said pressure sealing liquid groove for draining sealing liquid leaking along said shaft from said sealing liquid groove.

4. Sealing means for the rotor shaft extension protruding from the inlet end of the housing of a positive displacement axial flow blower, including a stationary casing surrounding and having a running fit with said shaft extension, said casing having an internal annular groove opening to said shaft extension, means for supplying sealing liquid under pressure to said groove, said casing having another internal annular groove spaced from said sealing liquid groove axially inward toward said blower housing and opening to said shaft, means communicating with said last named groove for draining sealing liquid leaking along said shaft extension from said sealing liquid groove to said sealing liquid drain groove, said casing at the inlet end of the blower housing having between said housing and said sealing liquid drain groove another internal annular groove opening to said shaft extension, and means providing communication between said last named groove and the outlet end of said blower housing for pressurizing said last named groove.

References Cited in the file of this patent

UNITED STATES PATENTS

| | | |
|---|---|---|
| 1,119,972 | Machlet | Dec. 8, 1914 |
| 1,759,074 | Van Rijswijk | May 20, 1930 |
| 2,245,281 | Klopak | June 10, 1941 |
| 2,347,296 | Starr | Apr. 25, 1944 |
| 2,356,011 | Sheldon | Aug. 15, 1944 |
| 2,555,492 | Kidney | June 5 1951 |
| 2,602,680 | Church | July 8, 1952 |
| 2,632,395 | Jennings | Mar. 24, 1953 |

FOREIGN PATENTS

| | | |
|---|---|---|
| 636,298 | Great Britain | Apr. 26, 1950 |
| 657,396 | Great Britain | Sept. 19, 1951 |
| 981,140 | France | Jan. 10, 1951 |